United States Patent
Minegishi

(10) Patent No.: US 8,701,514 B2
(45) Date of Patent: Apr. 22, 2014

(54) SPEED REDUCER USED FOR WIND POWER GENERATION FACILITY

(75) Inventor: Kiyoji Minegishi, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 130 days.

(21) Appl. No.: 13/450,876

(22) Filed: Apr. 19, 2012

(65) Prior Publication Data

US 2012/0267210 A1 Oct. 25, 2012

(30) Foreign Application Priority Data

Apr. 22, 2011 (JP) .................................. 2011-96209

(51) Int. Cl.
*F16H 3/08* (2006.01)
*F16H 57/04* (2010.01)

(52) U.S. Cl.
USPC ......................................................... 74/325

(58) Field of Classification Search
USPC .............................................. 74/325, 606 R
See application file for complete search history.

(56) References Cited

U.S. PATENT DOCUMENTS

| | | | |
|---|---|---|---|
| 8,177,510 B2 * | 5/2012 | Nies et al. ................. | 416/169 R |
| 8,310,080 B2 * | 11/2012 | Ramanujam .................... | 290/55 |
| 8,574,083 B2 * | 11/2013 | Minegishi et al. .............. | 464/30 |
| 2007/0098549 A1 | 5/2007 | Nies | |
| 2011/0265593 A1 | 11/2011 | Minegishi et al. | |

FOREIGN PATENT DOCUMENTS

JP 2004-232500 A 8/2004

OTHER PUBLICATIONS

European Search Report dated Nov. 27, 2013 corresponding to European Patent Application No. 12002741.2.

* cited by examiner

*Primary Examiner* — Ha D Ho
(74) *Attorney, Agent, or Firm* — Squire Sanders (US) LLP

(57) ABSTRACT

A speed reducer used for a wind power generation facility includes a two-stage reduction mechanism of at least a front stage reduction mechanism and a rear stage reduction mechanism; a coupling that is arranged between the front stage reduction mechanism and the rear stage reduction mechanism and has a torque limiter mechanism which does not transfer a torque exceeding a predetermined value; and an oil seal that partitions and seals a space where the front stage reduction mechanism is accommodated and a space where the coupling is accommodated. The front stage reduction mechanism is separable from the coupling in a sealed state by the oil seal.

3 Claims, 4 Drawing Sheets

US 8,701,514 B2

SPEED REDUCER USED FOR WIND POWER GENERATION FACILITY

BACKGROUND

1. Technical Field

The present invention relates to a speed reducer used for a wind power generation facility.

This application claims benefit of Japanese Patent Application No. 2011-096209 filed on Apr. 22, 2011, which is hereby incorporated by reference.

2. Description of the Related Art

A speed reducer used for yaw control of a nacelle (generator chamber) of a wind power generation facility or pitch control of windmill blades is disclosed in the related art.

Since the wind power generation facility is installed in a natural environment, the facility may sometimes receive turbulent wind or gusts.

The related art discloses the technique of actuating a slip coupling and cutting off power transmission of a drive system to prevent overloading of the drive system, when an excessive torque exceeding a setting value has been input from the windmill blade side.

SUMMARY

According to an embodiment of the present invention, there is provided a speed reducer used for a wind power generation facility including a two-stage reduction mechanism of at least a front stage reduction mechanism and a rear stage reduction mechanism; a coupling that is arranged between the front stage reduction mechanism and the rear stage reduction mechanism and has a torque limiter mechanism which does not transfer a torque exceeding a predetermined value; and an oil seal that partitions and seals a space where the front stage reduction mechanism is accommodated and a space where the coupling is accommodated. The front stage reduction mechanism is separable from the coupling in a sealed state by the oil seal.

DETAILED DESCRIPTION

Figure 1:
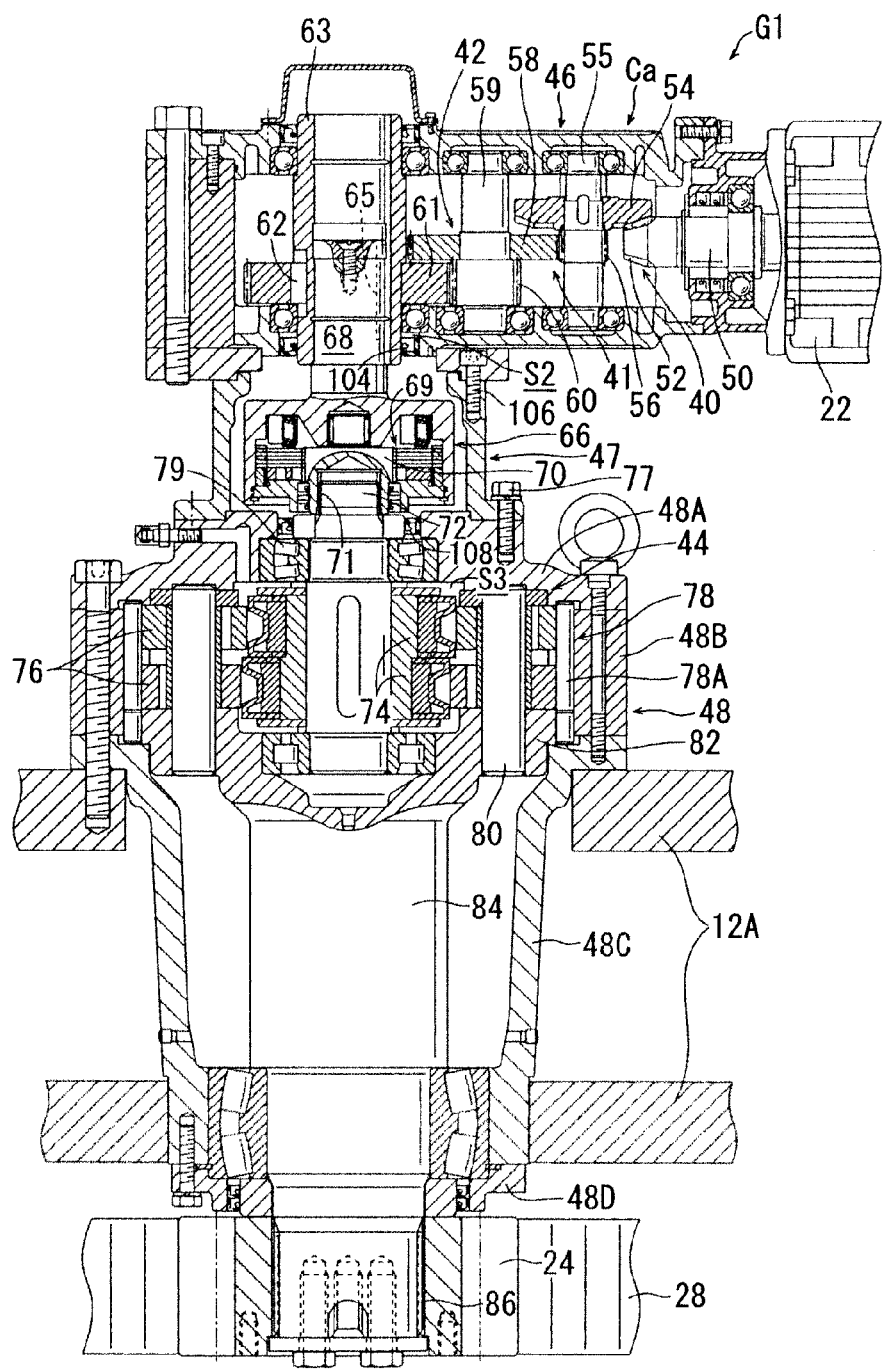
FIG. 1 is an overall cross-sectional view of a speed reducer used for a wind power generation facility related to an example of an embodiment of the present invention.

This slip coupling is not assumed to be repeatedly used as is after slipping, and includes a sensor that detects occurrence of slipping, and is contrived so as to show that maintenance of the slip coupling should be performed during the next maintenance stop. However, the slip coupling is not configured so that the slip coupling in particular only can be easily replaced. Therefore, in order to perform maintenance or replacement of the slip coupling, it is necessary to carry up the slip coupling up to the nacelle again to reinstall the speed reducer after the (entire) speed reducer is taken down to the ground from the nacelle of the wind power generation facility once and maintenance or replacement of the slip coupling is performed.

However, the nacelle of the wind power generation facility is installed at a height of tens of meters from the ground. In order to take the large and heavy speed reducer for maintenance, replacement, or the like of the slip coupling down to the ground from the nacelle and to carry the speed reducer up to the nacelle again, there is a problem in that great labor and costs are required.

It is desirable to prevent damage to a speed reducer used for a wind power generation facility, and reduce burden on maintenance of the speed reducer.

In the embodiment of the present invention, the coupling having the torque limiter mechanism that does not transmit a torque exceeding a predetermined value is arranged between the front stage reduction mechanism and the rear stage reduction mechanism. Therefore, even if the speed reducer is not unnecessarily enlarged overall, an excessive torque can be prevented from being applied directly to individual elements within the speed reducer by releasing the excessive torque temporarily input from the windmill blade side, and damage to the individual elements can be prevented.

On the other hand, when such a configuration is adopted, the necessity for regularly or irregularly replacing some or all of the torque limiter mechanism inevitably is caused. However, in the present invention, the oil seal is provided to partition and seal the space where the front stage reduction mechanism is accommodated and the space where the coupling is accommodated, and the front stage reduction mechanism is separable from the coupling in a sealed state by the oil seal. Therefore, the coupling (in a state where the speed reducer is installed at the nacelle) can be easily exposed by removing the front stage reduction mechanism (although the preferable arrangement position of the coupling usually becomes the rear stage side of the front stage reduction mechanism). Accordingly, not only it is not necessary to take the speed reducer down to the ground, or carry up the speed reducer in order to replace the coupling, but also it is possible to omit the effort of reinstalling the speed reducer in a narrow nacelle.

According to an embodiment of the present invention, damage to a speed reducer used for a wind power generation facility can be prevented, and burden on maintenance of the speed reducer can be reduced.

Hereinafter, a power transmission device related to an example of an embodiment of the invention will be described in detail.

The outline of a wind power generation facility to which the speed reducer is applied will first be described.

Figure 4:
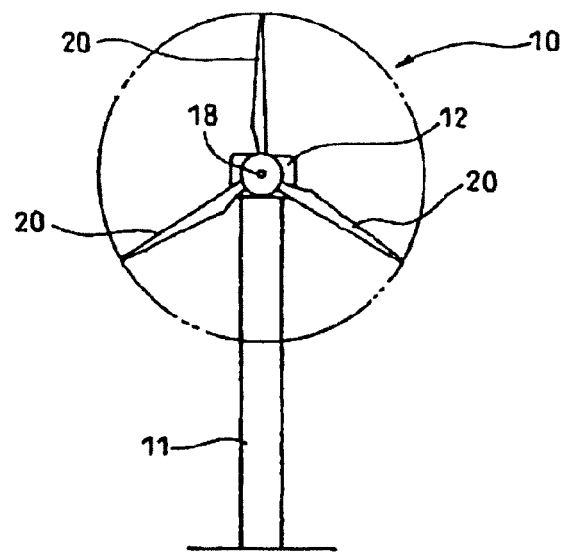
FIG. 4 is a front view showing the overall wind power generation facility.
Figure 5:
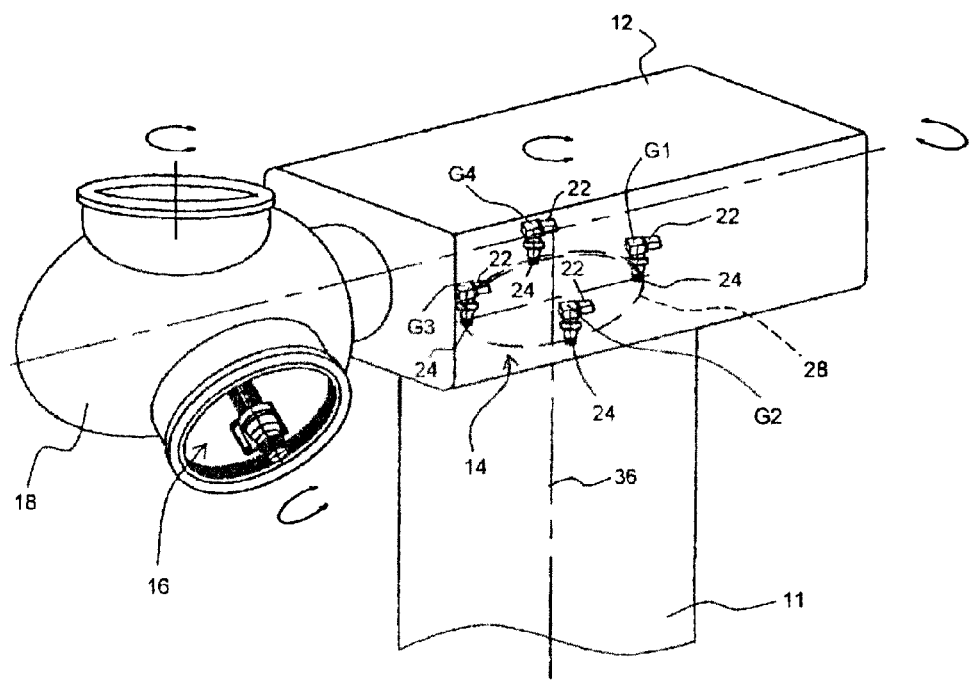
FIG. 5 is a perspective view showing an aspect in which the speed reducer is assembled into the nacelle of the above wind power generation facility.

Referring to FIGS. 4 and 5, a wind power generation facility 10 includes a nacelle (generator chamber) 12 at the uppermost part of a cylindrical supporting post 11. A yaw driving unit 14 and a pitch driving unit 16 are assembled into the nacelle 12. The yaw driving unit 14 is provided to control the turning angle of the overall nacelle 12 with respect to the cylindrical supporting post 11, and the pitch driving unit 16 is provided to control the pitch angle of three windmill blades 20 attached to the nose cone 18

In this embodiment, since the present invention is applied to the yaw driving unit 14, the yaw driving unit 14 will be described here.

Properly referring to FIG. 1 together, the yaw driving unit 14 includes four speed reducers G1 to G4 with a motor 22 and an output pinion 24, and one internal gear 28 for turning that meshes with the respective output pinions 24. The individual speed reducers G1 to G4 are respectively fixed to predetermined positions on the side of a body 12A of the nacelle 12.

The internal gear 28 for turning (may be an external gear) that meshes with the respective output pinions 24 of the individual speed reducers G1 to G4 is fixed to the cylindrical supporting post 11 side.

Through this configuration, when the individual output pinions 24 are simultaneously rotated by the motors 22 of the individual speed reducers G1 to G4, the output pinions 24 revolve around a center 36 (refer to FIG. 5) of the internal gear 28 for turning while meshing with the internal gear 28 for turning. As a result, the entire nacelle 12 can be turned around the center 36 of the internal gear 28 for turning fixed to the cylindrical supporting post 11. Thereby, the nose cone 18 can be directed to a desired direction (for example, a windward direction), and wind pressure can be efficiently received.

Since the speed reducers G1 to G4 have the same configuration, respectively, the speed reducer G1 will be described here.

Referring to FIG. 1, as for the speed reducer G1, the motor 22 equipped with a braking device (not shown), an orthogonal gear mechanism 40, first and second parallel axis reduction mechanisms 41 and 42, and a final stage reduction mechanism 44 are arranged in this order within a casing Ca on a power transmission path. In the present embodiment, for the second parallel axis reduction mechanism 42 corresponds to a front stage reduction mechanism of the present invention, and the final stage reduction mechanism 44 corresponds to a rear stage reduction mechanism of the present invention.

In addition, the casing Ca can be divided into a high-speed-side casing body 46, a joint casing body 47, and the low-speed-side casing body 48. The low-speed-side casing body 48 can also be divided into an anti-load-side cover body 48A, first and second bodies 48B and 48C, and a load-side cover body 48D.

Hereinafter, description will be made in the order along the power transmission path. A motor shaft 50 of the motor 22 also serves as an input shaft of the orthogonal gear mechanism 40. The orthogonal gear mechanism 40 includes a hypoid pinion 52 directly formed at the tip of the motor shaft 50, and a hypoid gear 54 that meshes with the hypoid pinion 52, and changes the rotational direction of the motor shaft 50 to a perpendicular direction. The hypoid gear 54 is fixed to a first intermediate shaft 55. A spur pinion 56 of the first parallel axis reduction mechanism 41 is directly formed in the first intermediate shaft 55. The first parallel axis reduction mechanism 41 includes the spur pinion 56, and a spur gear 58 that meshes with the spur pinion 56. The spur gear 58 is fixed to a second intermediate shaft 59. A spur pinion 60 of the second parallel axis reduction mechanism 42 is directly formed in the second intermediate shaft 59. The second parallel axis reduction mechanism 42 includes the spur pinion 60, and a spur gear 61 that meshes with the spur pinion 60. The spur gear 61 is fixed to a hollow shaft 62 via a key 63. The hollow shaft 63 is coupled to a coupling housing 68 of coupling 66 via the key 65.

The coupling 66 has a torque limiter mechanism 69 in the coupling housing 68. A configuration in the vicinity of the coupling 66 will be described below in detail. The output member 70 of the coupling 66 is coupled to an input shaft 72 of the final stage reduction mechanism 44 via a spline 71.

The final stage reduction mechanism 44 includes two eccentric bodies 74 provided at the input shaft 72, two external gears 76 that eccentrically oscillate via the eccentric bodies 74, and an internal gear 78 that internally meshes with the external gears 76. The two external gears 76 shift by exactly 180 degrees from each other in an eccentric phase, and rotate in an oscillating manner while maintaining a state where the external gears are eccentric from each other in mutually separating directions. The internal gear 78 is integrated with the first body 48B of the low-speed-side casing body 48. The internal teeth of the internal gear 78 are constituted by cylindrical outer pins 78A, respectively. The number (the number of the outer pins 78A) of the internal teeth of the internal gear 78 is one more than the number of the external teeth of the external gears 76. Inner pins 80 are loosely fitted to the external gears 76. The inner pins 80 are integrated with an output flange 82, and the output flange 82 is integrated with an output shaft 84 of the speed reducer G1. In this embodiment, the internal gear 78 is integrated with the first body 48B of the low-speed-side casing body 48. Therefore, when the input shaft 72 of the final stage reduction mechanism 44 rotates, the external gears 76 oscillate via the eccentric bodies 74, and the rotation (rotation on its own axis) of the external gears 76 relative to the internal gear 78 is taken out from the output shaft 84 via the inner pins 80 and the output flange 82. The above-mentioned output pinion 24 is fixed and coupled to the output shaft 84 via a spline 86, and this output pinion 24 meshes with the internal gear 28 (FIGS. 4 and 5) for turning that is already described.

Here, in this embodiment, the coupling 66 having the torque limiter mechanism 69 that does not transmit a torque exceeding a predetermined value is arranged between the second parallel axis reduction mechanism (front stage reduction mechanism) 42 and the final stage reduction mechanism (rear stage reduction mechanism) 44.

Figure 2:
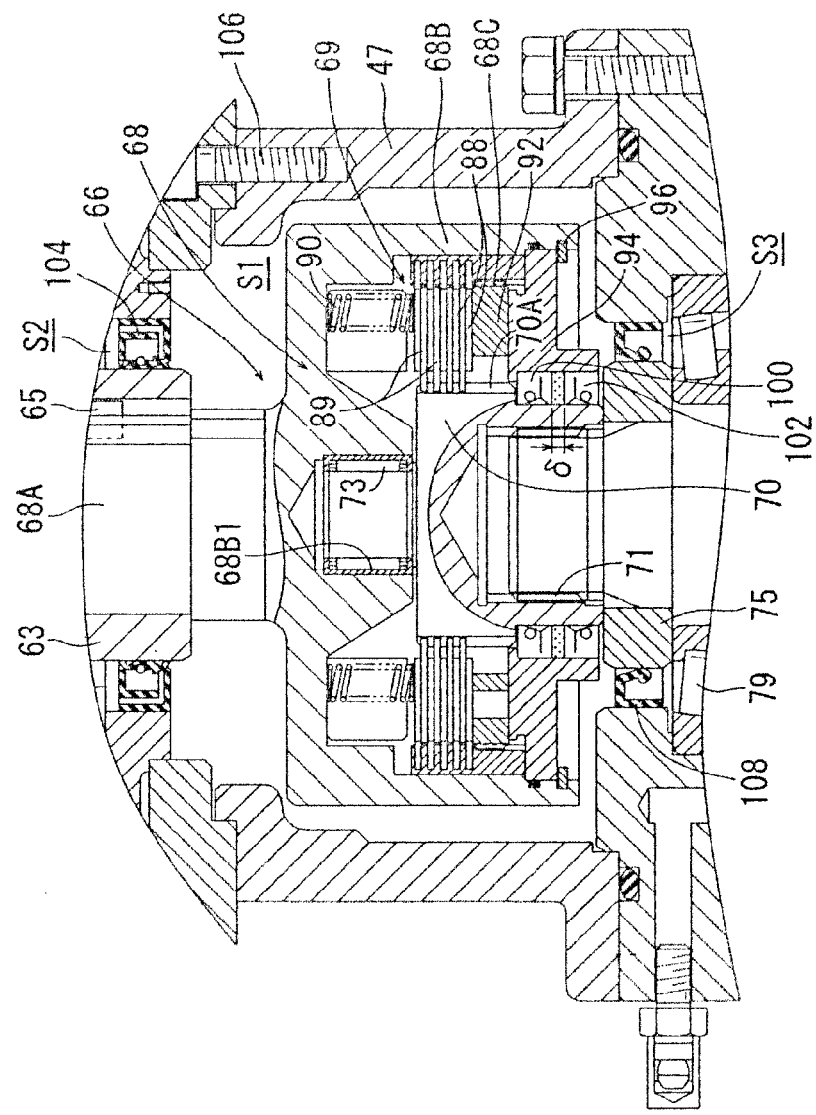
FIG. 2 is an enlarged cross-sectional view of the main parts of the speed reducer.
Figure 3:
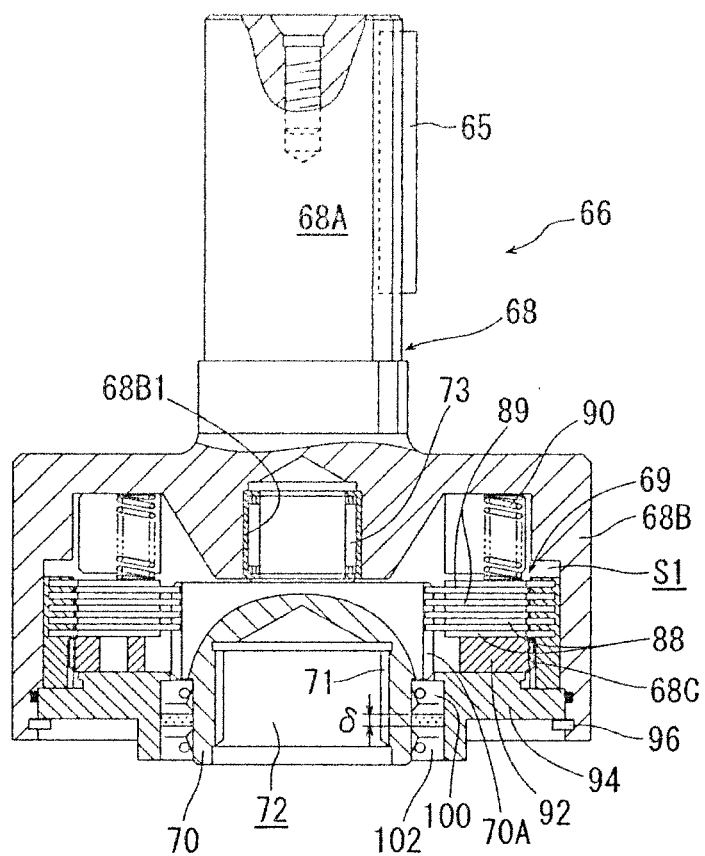
FIG. 3 is a cross-sectional view showing a state where the coupling of the speed reducer is taken out.

Referring to FIGS. 2 and 3 together, a configuration in the vicinity of the coupling 66 will be described below in detail. FIG. 2 is an enlarged cross-sectional view of the main parts in the vicinity of the coupling 66, and FIG. 3 is a cross-sectional view showing a state where only the coupling 66 is taken out.

The coupling 66 is mainly constituted by the coupling housing 68 that functions as an input shaft of the coupling 66, the torque limiter mechanism 69, and the output member 70 that functions as an output shaft of the coupling 66.

The coupling housing 68 integrally has a shaft portion 68A coupled to a key 65 in the front stage via the hollow shaft 63, and an accommodation portion 68B that accommodates the torque limiter mechanism 69.

The torque limiter mechanism 69 accommodated within the accommodation portion 68B has a plurality of first friction plates 88 and a plurality of second friction plates 89 alternately in the axial direction. The first friction plates 88 are movable in the axial direction along a spline 68C formed at (the accommodation portion 68B of) the coupling housing 68, and are fixed to the coupling housing 68 in the circumferential direction. The second friction plates 89 are movable in the axial direction along a spline 70A formed at an output member 70, and are fixed to the output member 70 in the circumferential direction.

The first and second friction plates 88 and 89 are biased to the load side in the axial direction by a spring 90. On the other hand, a spacer 92 that abuts on the first friction plates 88 is movable in the axial direction along a spline 68C. Additionally, a cover body 94 that abuts on the spacer 92 is configured so as not to be able to move to the load side in the axial direction due to a retaining ring 96 fitted into the coupling housing 68. That is, the first and second friction plates 88 and 89 can receive a reaction force against the biasing force of the spring 90 from the coupling housing 68 via the spacer 92, the cover body 94, and the retaining ring 96. As a result, when the transmission torque is equal to or less than a predetermined value (rotates mutually integrally), the first and second friction plates 88 and 89 are enabled to transmit torque between the coupling housing 68 and the output member 70. However, when the transmission torque exceeds a predetermined value, since the first and second friction plates 88 and 89 slip out, there is a characteristic in which (a torque exceeding a predetermined value) is not transmitted.

The output member 70 of the coupling 66 is rotatably supported by a recess 68B1 of the accommodation portion 68B of the coupling housing 68 via needles 73. In addition, reference numeral 75 designates is a bush that regulates the axial position of the output member 70 and a bearing 79 of the input shaft 72 of the final stage reduction mechanism 44. As mentioned above, the output member 70 is coupled to an input shaft 72 of the final stage reduction mechanism 44 via the spline 71.

Two coupling seals 100 and 102 are juxtaposed between the cover body 94 of the coupling housing 68, and the output member 70, and seal the inside of the accommodation portion 68B of the coupling housing 68. The inside of the accommodation portion 68B is filled with oil that lubricates the first and second friction plates 88 and 89 that are constituent elements of the torque limiter mechanism 69. That is, the first and second friction plates 88 and 89 are wet friction plates. In addition, the two coupling seals 100 and 102 are arranged with a gap Δ therebetween, and this gap Δ is enclosed with grease having low viscosity (hard).

The coupling 66 is accommodated within a space S1 of the joint casing body 47. The space S1 where the coupling 66 is accommodated, and a space S2 where the second parallel axis reduction mechanism 42 (that is the front stage reduction mechanism) is accommodated are partitioned and sealed by an oil seal 104. Therefore, by removing a bolt 106, the second parallel axis reduction mechanism 42 can be entirely separated from similar coupling 66 (in a state where the seal is made by the oil seal 104), and the coupling 66 can be exposed.

Additionally, in this embodiment, an oil seal 108 is provided to partition and seal the space S1 where the coupling 66 is accommodated and a space S3 where the final stage reduction mechanism 44 is accommodated. For this reason, the coupling 66 can also be separated from the final stage reduction mechanism 44.

Next, the operation of the speed reducer G1 of the yaw driving unit related to this embodiment will be described.

The rotation of the motor shaft 50 of the motor 22 is speed-reduced at an initial stage by the meshing between the hypoid pinion 52 and the hypoid gear 54 of the orthogonal gear mechanism 40, and simultaneously, the direction of the rotating shaft is changed by 90 degrees, whereby the rotation is transmitted to the intermediate shaft 55 of the first parallel axis reduction mechanism 41.

The rotation of the intermediate shaft 55 is speed-reduced by the spur pinion 56 and the spur gear 58 of the first parallel axis reduction mechanism 41, and the intermediate shaft 59, the spur pinion 60, and the spur gear 61 of the second parallel axis reduction mechanism 42, and is transmitted to the hollow shaft 63 by the key 62. The rotation of the hollow shaft 63 is transmitted to the coupling housing 68 (corresponding to the input shaft) of the coupling 66 via the key 65.

The working effects of the coupling 66 will be described below in detail.

When the output member 70 (corresponding to the output shaft) of the coupling 66 rotates, the input shaft 72 of the final stage reduction mechanism 44 rotates via the spline 71. When the input shaft 72 of the final stage reduction mechanism 44 rotates, the external gears 76 rotate in an oscillating manner via the eccentric bodies 74 (while internally meshing with the internal gear 78). Therefore, a phenomenon in which the meshing positions with the internal gear 78 shifts sequentially occurs. As a result, whenever the input shaft 72 of the final stage reduction mechanism 44 rotates once, the external gear 76 oscillates once, and the phase thereof shifts one tooth at a time with respect to the internal gear 78 (in a fixed state) (a rotation component on its own axis is generated). Speed reduction in the final stage reduction mechanism 44 is realized by taking out this rotation component on its own axis to the output shaft 84 side via the inner pins 80 and the output flange 82. The rotation of the output shaft 84 is transmitted to the output pinion 24 via the spline 86. Since the output pinion 24 meshes with the internal gear 28 for turning, and the internal gear 28 for turning is fixed to the cylindrical supporting post 11 side, eventually, the nacelle 12 is turned in the horizontal direction with respect to the cylindrical supporting post 11 by a reaction.

Here, the working effects of the coupling 66 will be described in detail.

If the coupling housing 68 rotates via the key 65, the plurality of first friction plates 88 (of the torque limiter mechanism 69) that are fixed to the coupling housing 68 in the circumferential direction rotates integrally. Since the individual first friction plates 88 are brought into the state of strongly pinching the plurality of second friction plates 89 by the biasing force of the spring 90, when the rotary torque transmitted from the coupling housing 68 is equal to or less than a predetermined value, the rotary torque of the coupling housing 68 is transmitted to the output member 70 via the first friction plates 88 and the second friction plates 89. The output member 70 rotates the input shaft 72 of the final stage reduction mechanism 44 via the spline 71. This is an action during the operation by normal motor driving.

On the other hand, when a huge torque to turn the nacelle 12 as gust, a storm, or the like act on the windmill blades 20 is input from the output pinion 24 side of the speed reducer G1 for yaw driving, this huge "wind-force load" drives the final stage reduction mechanism 44 of the speed reducer G1 backward. That is, the input shaft 72 of the final stage reduction mechanism 44 is going to rotate the output member 70 of coupling 66 via the spline 71. If this load torque has a magnitude equal to or less than the predetermined value, slipping does not occur between the first and second friction plates 88 and 89 of the torque limiter mechanism 69 of the coupling 66, and the load torque is further transmitted to the second parallel axis reduction mechanism 42 side of the speed reducer G1 as it is, and is finally received by a braking device (not shown) that is attached to the motor 22. As a result, the movement of the nacelle 12 by wind is reliably braked. Additionally, in this case, no abnormality occurs in the individual parts of the reduction gear G1.

However, if the load torque exceeding a predetermined value is input from the output pinion 24 side (output member 70 side), slipping occurs between the first and second friction plates 88 and 89 of the torque limiter mechanism 69. Therefore, some of the load torque from the output pinion 24 side can be reproduced here. Accordingly, although the nacelle 12 is slightly turned by wind, damage to gears, bearings, or the like within the motor 22 or the speed reducer G1 can be prevented. Additionally, when a gust, a storm, or the like dies down, since the torque limiter mechanism 69 of the coupling 66 returns automatically to the original torque transmission state again, operation as the speed reducer G1 of the yaw driving unit 14 can be maintained as is.

In this embodiment, since the oil seal 104 is provided to partition and seal the space S2 where the second parallel axis reduction mechanism 42 is accommodated, and the space S1 where the coupling 66 is accommodated, the second parallel axis reduction mechanism 42 can be separated from the coupling 66 (in a state where sealing is made by the oil seal 104) by removing the bolt 106. That is, the oil of the space S2 of the second parallel axis reduction mechanism 42 does not leak out due to the presence of the oil seal 104 even if the second parallel axis reduction mechanism 42 is removed from the joint casing body 47. Therefore, the coupling 66 can be exposed in a state where the low-speed-side casing body 48 of the speed reducer G1 is installed on the body 12A side of the nacelle 12 (in a state where the output pinion 24 is made to mesh with the internal gear 28 for turning). Accordingly, maintenance is possible in this state, and the coupling 66 can also be replaced if required.

Particularly, in this embodiment, the oil seal 108 is provided to partition and seal the space S1 where the coupling 66 is accommodated and the space S3 where the final stage reduction mechanism 44 is accommodated. Therefore, after the oil around the coupling 66 can be extracted by a certain method, the joint casing body 47 can also be removed by removing the bolt 77. Accordingly, it is possible to bring about a state where the coupling 66 is completely exposed from the final stage reduction mechanism 44, and it is possible to separate and replace the coupling 66 extremely easily. This working effect becomes an extremely great merit in that not only it is not necessary to take the speed reducer G1 down to the ground in the replacement of the coupling 66 but also the replacement of the coupling 66 can be performed in a state where the low-speed-side casing body 48 of the speed reducer G1 is installed on the body 12A side of the nacelle 12.

Additionally, according to the speed reducer G1 related to the present embodiment, since it is unnecessary to provide a sensor or an electric control system in order to cope with an excessive torque caused by a wind force, a highly-reliable operation is possible even in a bad weather state in which the control system tends to be damaged by lightening, flooding, or the like. Particularly, since the torque limiter mechanism 69 of the coupling 66 is of a wet type, it is possible to always realize slip-out characteristic at a set "predetermined value" with high reproducibility without being influenced by the external environment (bad weather).

Additionally, the coupling 66 of the present embodiment is arranged between the third-stage second parallel axis reduction mechanism (front stage reduction mechanism) 42, and the final stage reduction mechanism (rear stage reduction mechanism) 44. For this reason, since the third-stage front stage reduction mechanism is present between the motor 22 and the coupling, even if the first and second friction plates 88 and 89 is slippery, the relative rotating speed is small (little wear). Additionally, since the one-stage rear stage reduction mechanism is present between the coupling and the output pinion 24, the handling capacity of the coupling 66 can be made small by the same amount, and the merit that the miniaturization of the individual members of the coupling 66 is realizable is obtained.

Additionally, since two coupling seals 100 and 102 that seal the first and second friction plates 88 and 89 within the accommodation portion 68B (further since grease is enclosed in the gap delta between the two coupling seals 100 and 102, one layer), the oil within the accommodation portion 68B does not leak out even if only the coupling 66 is removed. Additionally, the wear powder generated when the first and second friction plates 88 and 89 are slippery can be reliably prevented from being mixed in the final stage reduction mechanism 44 side. This can particularly reduce any damage to the oil seal 108 arranged at the entrance of the final stage reduction mechanism 44, and can increase the lifespan of the oil seal 108. Additionally, since the wear powder from the final stage reduction mechanism 44 side can be simultaneously prevented from entering the inside of the accommodation portion 68B of the coupling 66 due to the presence of the two coupling seals 100 and 102, the wear powder in the final stage reduction mechanism 44 can be prevented from affecting the operation of the first and second friction plates 88 and 89.

In addition, although the type in which a plurality of wet friction plates is provided as the torque limiter mechanism is adopted in the above embodiment, in the present invention, the configuration of the torque limiter mechanism is not particularly limited to this configuration, and dry friction plates may be used. Additionally, the friction plates do not necessarily need to be used. For example, there may be adopted a torque limiter mechanism of a type that has a disc having irregularities (cams) formed at the outer periphery thereof, and balls pressed against a recess of the disc by a predetermined biasing force. This torque limiter mechanism can transmit the torque as the balls and the disc rotate integrally when the torque transmitted between a member into which the disc is assembled and a member into which the balls are assembled is equal to or less than a predetermined value. However, if the torque to be transmitted exceeds a predetermined value, the balls are adapted to go over protrusions of the disc (the disc and the balls rotate relatively and torque transmission is no longer performed). Even in such a torque limiter mechanism, when torque exceeding a predetermined value is applied, wear or rolling fatigue is also apt to be generated in the disc or balls because the balls roll on the outer periphery of the disc, while the balls go over the irregularities of the disc (reciprocating radially). Accordingly, since maintenance or replacement of the torque limiter mechanism are needed at predetermined timing, the present invention functions effectively.

Additionally, in the speed reducer of the above embodiment, a total of four speed reduction stages are provided. Among these, the coupling is arranged between the third stage and the fourth (final stage) stage. However, in the present invention, the number of stages or specific configuration of a reduction mechanism are not limited as long as a two-stage reduction mechanism of the front stage reduction mechanism and the rear stage reduction mechanism are provided, and at least and the coupling is arranged between the front stage reduction mechanism and the rear stage reduction mechanism. For example, the reduction mechanisms may be a worm reduction mechanism and a simple planetary reduction mechanism.

Additionally, the example to which the invention has been applied to the speed reducer for yaw driving has been shown in the above embodiment. However, the invention can be similarly applied to, for example, a speed reducer of a pitch driving unit, and similarly working effects are obtained.

It should be understood that the invention is not limited to the above-described embodiment, but may be modified into various forms on the basis of the spirit of the invention. Additionally, the modifications are included in the scope of the invention.

What is claimed is:

1. A speed reducer used for a wind power generation facility, comprising:
   a two-stage reduction mechanism of at least a front stage reduction mechanism and a rear stage reduction mechanism;
   a coupling that is arranged between the front stage reduction mechanism and the rear stage reduction mechanism and has a torque limiter mechanism which does not transfer a torque exceeding a predetermined value; and
   an oil seal that partitions and seals a space where the front stage reduction mechanism is accommodated and a space where the coupling is accommodated, wherein the front stage reduction mechanism is separable from the coupling in a sealed state by the oil seal.

2. The speed reducer used for a wind power generation facility according to claim 1,
wherein the coupling includes oil that lubricates constituent elements of the torque limiter mechanism, and a coupling seal that seals the oil, and
wherein the coupling is separable from the rear stage reduction mechanism in a sealed state by the coupling.

3. The speed reducer used for a wind power generation facility according to claim 2,
wherein two coupling seals are juxtaposed, and grease is enclosed between the respective coupling seals.

* * * * *